United States Patent
Xu et al.

(10) Patent No.: US 10,389,280 B2
(45) Date of Patent: Aug. 20, 2019

(54) HIGH FREQUENCY INJECTION-BASED HIGH VOLTAGE INTERLOCK

(71) Applicant: Ford Global Technologies, LLC, Dearborn, MI (US)

(72) Inventors: Wei Xu, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 786 days.

(21) Appl. No.: 14/557,539

(22) Filed: Dec. 2, 2014

(65) Prior Publication Data

US 2016/0156290 A1 Jun. 2, 2016

(51) Int. Cl.
| | |
|---|---|
| *B60L 3/00* | (2019.01) |
| *H02P 6/12* | (2006.01) |
| *H02P 29/024* | (2016.01) |

(52) U.S. Cl.
CPC .............. *H02P 6/12* (2013.01); *B60L 3/0061* (2013.01); *H02P 29/0241* (2016.02); *B60L 2240/427* (2013.01); *B60L 2240/429* (2013.01); *Y02T 10/642* (2013.01)

(58) Field of Classification Search
CPC ........ H02P 6/12; H02P 29/0241; H02P 23/14; B60L 3/0061; G01R 31/346
USPC ..................................... 318/400.21, 690, 807
See application file for complete search history.

(56) References Cited

U.S. PATENT DOCUMENTS

| | | | | |
|---|---|---|---|---|
| 5,514,978 | A * | 5/1996 | Koegl ................ | G01R 31/346 318/690 |
| 6,141,196 | A * | 10/2000 | Premerlani .......... | H02H 1/0092 361/115 |
| 7,254,468 | B2 | 8/2007 | Pillar et al. | |
| 7,302,320 | B2 | 11/2007 | Nasr et al. | |
| 9,291,152 | B2 * | 3/2016 | Gupta ................ | F03D 7/0284 |
| 2006/0038530 | A1 * | 2/2006 | Holling ............... | H02P 23/14 318/807 |
| 2013/0270974 | A1 * | 10/2013 | Wang .................. | B60L 3/0069 310/68 R |
| 2014/0225548 | A1 * | 8/2014 | Xu ....................... | H02P 21/32 318/400.33 |

* cited by examiner

Primary Examiner — Eduardo Colon Santana
Assistant Examiner — Zemenay T Truneh
(74) Attorney, Agent, or Firm — David Kelley; Brooks Kushman P.C.

(57) ABSTRACT

A power inverter for driving an electric machine is configured to apply a voltage to the electric machine based on a high-frequency injection current. Three phase currents are measured and input into a current controller. A voltage command output from the current controller is monitored using a discrete Fourier transform to determine a positive and negative sequence voltage of the voltage command. The sequence voltages are compared to expected positive and negative sequence voltages. A loss of connection diagnostic is output if a magnitude of the difference between the expected and actual sequence voltages is greater than a predetermined threshold.

17 Claims, 4 Drawing Sheets

HIGH FREQUENCY INJECTION-BASED HIGH VOLTAGE INTERLOCK

TECHNICAL FIELD

This application generally relates to detecting cable connections for electric machines.

BACKGROUND

A hybrid-electric or all-electric vehicle includes one or more electric machines that are used for vehicle propulsion. The electric machines operate with relatively large voltages and currents when compared to a traditional 12 Volt vehicle power system. A high voltage system may monitor the connection status of the electric machines. A typical electric machine may be a three-phase motor and include connection of three conductors between the electric machine and a power inverter. To monitor the connection status, an additional low-voltage signal line is often included between the power inverter and the electric machines. The additional low-voltage signal is monitored to ascertain the connection status between power inverter and the electric machines.

SUMMARY

A vehicle includes an electric machine and at least one controller programmed to apply a voltage to the electric machine corresponding to an injection current and, in response to sequence voltages associated with the voltage being a predetermined amount greater than predetermined sequence voltages that are based on parameters of the injection current and parameters of the electric machine, output a loss of connection diagnostic. The frequency of the injection current may be a predetermined multiple of a switching frequency corresponding to a rate at which the voltage is changed. A magnitude of the injection current may be a predetermined magnitude. The at least one controller may be further programmed to apply the voltage when a speed of the electric machine is less than a predetermined speed. The predetermined sequence voltages may be based on an inductance of the electric machine. The voltage may increase in response to a connection to the electric machine being disconnected. The at least one controller may be further programmed to receive a measured current in the electric machine and control the voltage according to a difference between the measured current and the injection current.

A method includes outputting, by a controller, a voltage to an electric machine based on a diagnostic injection current reference and a measured current. The method further includes outputting, by the controller, a loss of connection diagnostic in response to sequence voltages associated with the voltage being greater than predetermined sequence voltages by a predetermined amount. The predetermined sequence voltages may be based on parameters of the diagnostic injection current reference and parameters of the electric machine. The sequence voltages may be based on a discrete Fourier transform of the voltage. The voltage may be based on a difference between the diagnostic injection current reference and the measured current. The frequency of the diagnostic injection current reference may be a predetermined multiple of a switching frequency corresponding to a rate at which the voltage is changed.

A power inverter includes at least one controller programmed to apply a voltage to an electric machine corresponding to an injection current and, in response to sequence voltages associated with the voltage being greater than predetermined sequence voltages that are based on parameters of the injection current and parameters of the electric machine by a predetermined amount, output a loss of connection diagnostic. The frequency of the injection current may be a predetermined multiple of a switching frequency corresponding to a rate at which the voltage is changed. The magnitude of the injection current may be a predetermined magnitude. The at least one controller may be further programmed to apply the voltage when a speed of the electric machine is less than a predetermined speed. The predetermined sequence voltages may be based on an inductance of the electric machine. The voltage may increase in response to a connection to the electric machine being disconnected. The at least one controller may be further programmed to measure a current in the electric machine and control the voltage according to a difference between the current and a desired injection current. The sequence voltages may be based on a discrete Fourier transform of the voltage.

The system described allows a connection between the power inverter and the electric machine to be detected without any additional connectors or conductors. The injection current may be selected to have a small magnitude which reduces safety concerns when no connection is present. The system does not require extensive calibration and can reliably detect the presence or absence of the connection.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
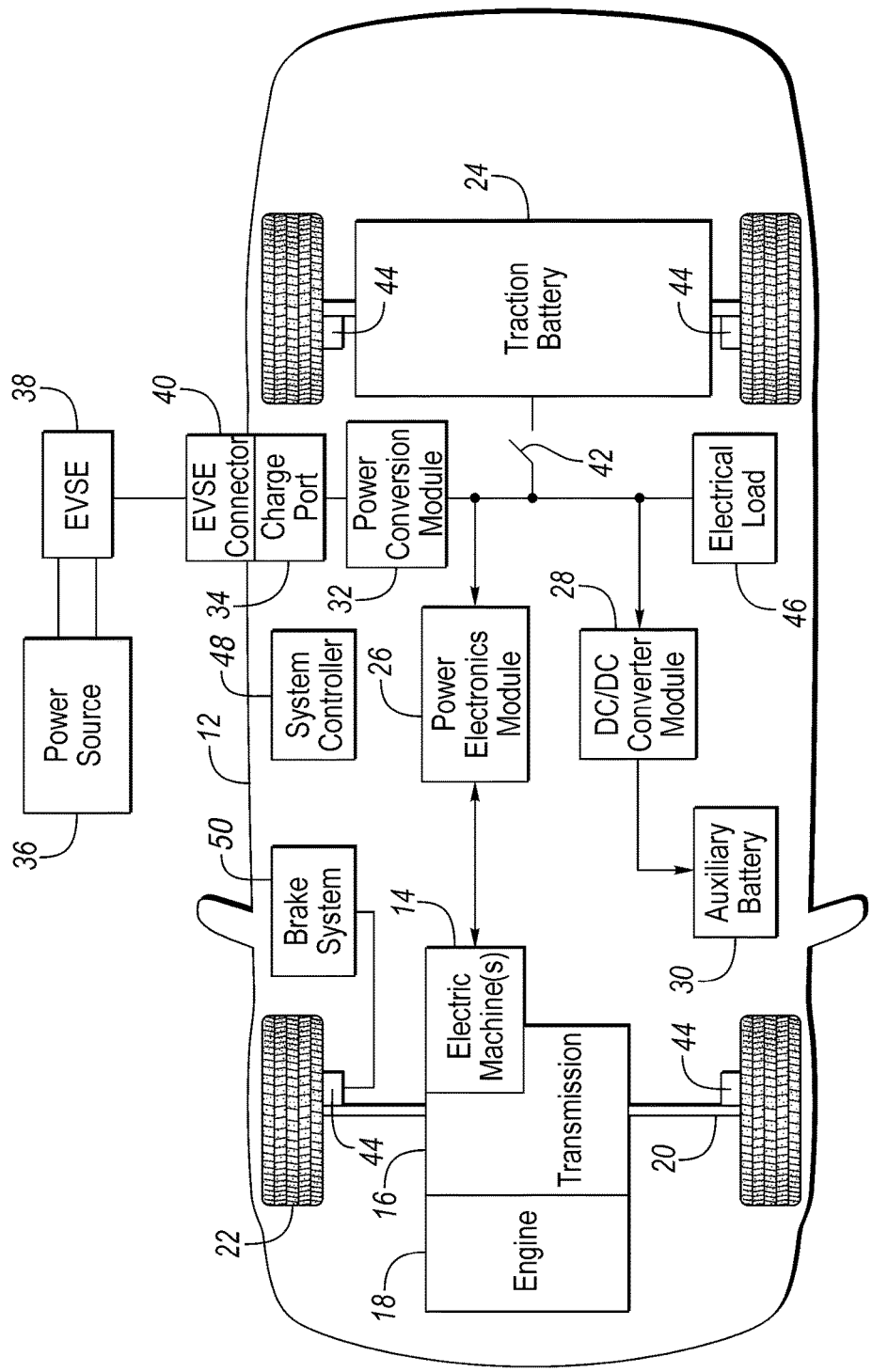
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules 26. The power electronics module 26 may also be referred to as a power inverter. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be connected to the high-voltage bus. The electrical loads 46 may have an associated controller that operates and controls the electrical loads 46 when appropriate. Examples of electrical loads 46 may be a heating module or an air-conditioning module.

The various components discussed may have one or more associated controllers to control and monitor the operation of the components. The controllers may communicate via a serial bus (e.g., Controller Area Network (CAN)) or via discrete conductors. A system controller 48 may be present to coordinate the operation of the various components.

The electric machine 14 may be coupled to the power electronics module 26 via one or more conductors. The conductors may be part of a wiring harness between the electric machine 14 and the power electronics module 26. The system may implement a strategy to detect that the conductors are connected between the electric machine 14 and the power electronics module 26. Various strategies may be implemented to detect the connection between the electric machine 14 and the power electronics module 26. Some strategies may use a separate interlock conductor that may be monitored by a controller. Such a separate interlock conductor adds additional cost and complexity to the system.

An electric machine 14 may be controlled via signals provided by the power electronics module 26 (also referred to as the power inverter). The torque output of the electric machine 14 may be controlled by controlling a current output of the power electronics module 26. The power electronics module 26 may convert a DC voltage input to an alternating three-phase voltage and current output to the electric machine 14. Well-known motor control strategies are available to transform the three-phase voltages into signals more suitable for control purposes.

A high-voltage interlock (HVIL) strategy to detect that the electric machine 14 and the power electronics module 26 are properly coupled may be implemented. The HVIL strategy may detect the presence or absence of a connection without an additional interlock conductor. The HVIL strategy may include injection of a high-frequency current to the electric machine 14.

The power electronics module 26 may be controlled to provide sinusoidal voltage and current signals to the electric machine 14. When the electric machine 14 is being controlled for propulsion, the frequency of the signals may be proportional to the rotational speed of the electric machine 14. When the electric machine 14 is not being used for propulsion, signals may be injected for the purpose of checking the wiring connection. The injected signals may have an amplitude and frequency that does not cause the electric machine 14 to rotate. Further, the amplitude of the injected signals may be sufficiently small so as to minimize shock hazards.

Before operating the electric machine 14 for propulsion, a sequence of operations may be performed to ensure that the electric machine 14 is properly coupled to the power electronics module 26. A voltage may be applied to the terminals of the electric machine 14 to produce a current in the electric machine 14. The current may be a signal of relatively high frequency in order to properly detect the presence of a connection.

The power electronics module 26 may be configured to adjust the voltage and current output at a predetermined switching frequency. The switching frequency may be the rate at which the states of switching devices within the power electronics module 26 are changed. The frequency of the injection current may be selected such that there is a predetermined ratio between the switching frequency and the injection current frequency. The predetermined ratio may be a value between 10 and 20.

The system may be configured to provide a voltage to the electric machine 14 to provide a desired current. The desired current may be the high frequency injection current. The power electronics module 26 may implement a field-oriented control scheme to control the electric machine 14. Field-oriented control of electric machines 14 is well-known in the art so only limited aspects may be described herein.

Field-oriented electric machine control may define an alternate coordinate system for controlling voltages and currents of the electric machine 14. The coordinate system selected allows for simpler control logic than the three-phase coordinate system of the electric machine 14. The selected coordinate system may transform the three-phase alternating voltage and currents into a coordinate system in which the voltages and currents are represented by DC voltages and currents. The transformation to DC values allows for more effective controls to be implemented.

The power electronics module 26 may include one or more current sensors to measure current in one or more of the phases of the electric machine 14. Typically, two current sensors are utilized and the third phase current is calculated from the two measured currents. A controller associated with the power electronics module 26 may sample the current sensors at a predetermined sampling rate. Values for each phase current of the electric machine 14 may be stored in controller memory for later computations.

The three phase values may be transformed into a two-axis coordinate system using one or more coordinate transformations. The three phase values may be measured or calculated values. For example, in field-oriented electric machine control, coordinate transformations, such as the Park and Clarke coordinate transformations, are well known. The output of one coordinate transformation may be a vector in a stationary two-axis reference frame. One possible transformation from the three-phase quantities is the Clarke transformation which may be expressed as $$\begin{bmatrix} X_\alpha \\ X_\beta \end{bmatrix} = \begin{bmatrix} 2/3 & -1/3 & -1/3 \\ 0 & 2/\sqrt{3} & -2/\sqrt{3} \end{bmatrix} \begin{bmatrix} X_a \\ X_b \\ X_c \end{bmatrix} \quad (1)$$

where $X_a$, $X_b$, and $X_c$ are the three-phase values which may represent a current or voltage.

The Clarke transformation converts a three-phase system into the stationary two-axis reference frame. For control purposes, it may be desired to perform calculations with respect to a two-axis reference frame that rotates with respect to the stationary frame. One possible transformation is the Park transformation which may be expressed as $$\begin{bmatrix} X_d \\ X_q \end{bmatrix} = \begin{bmatrix} \cos(\theta) & \sin(\theta) \\ -\sin(\theta) & \cos(\theta) \end{bmatrix} \begin{bmatrix} X_\alpha \\ X_\beta \end{bmatrix} \quad (2)$$

where $\theta$ is the angle of the rotating frame with respect to the stationary frame. The rotating reference frame proves useful for motor control purposes as a rotating reference frame may be chosen in which the d-axis and q-axis values behave as DC values instead of alternating values. For example, a current vector having a d-component and a q-component may be utilized for controlling the current in the electric machine 14. The d-component may represent a flux component, and the q-component may represent a torque component.

The flux and torque of the electric machine 14 may be controlled by adjusting the d-component and the q-component of the injection current. A flux controller may be implemented to adjust the d-component. The flux controller may input an error between a reference flux current and the measured flux current (d-component). The flux controller may output a d-component voltage command that may achieve the reference flux current. A torque controller may be implemented to adjust the q-component. The torque controller may input an error between a reference torque current and the measured torque current (q-component). The torque controller may output a q-component voltage command that may achieve the reference torque current.

The advantage of the rotating reference frame is evident when considering a three-phase sinusoid having a constant amplitude and frequency. In the stationary two-axis reference frame, the $X_\alpha$ and $X_\beta$ components will vary at the frequency of the sinusoidal signal. The same signal may be represented in a rotating reference frame that rotates at the same constant frequency. In the rotating reference frame, the $X_d$ and $X_q$ components will appear to be constant values.

Quantities in the rotating reference frame may be returned to the stationary reference frame by the inverse of the Park transformation which may be expressed as $$\begin{bmatrix} X_\alpha \\ X_\beta \end{bmatrix} = \begin{bmatrix} \cos(\theta) & -\sin(\theta) \\ \sin(\theta) & \cos(\theta) \end{bmatrix} \begin{bmatrix} X_d \\ X_q \end{bmatrix} \quad (3)$$

A quantity in the stationary two-axis reference frame may be returned to the three-phase frame using the inverse of the Clarke transformation which may be expressed as $$\begin{bmatrix} X_a \\ X_b \\ X_c \end{bmatrix} = \begin{bmatrix} 1 & 0 \\ -1/2 & \sqrt{3}/2 \\ -1/2 & -\sqrt{3}/2 \end{bmatrix} \begin{bmatrix} X_\alpha \\ X_\beta \end{bmatrix} \quad (4)$$

The description above represents one possible coordinate transformation scheme. Other transformations are possible. In actual implementation, the transformation matrices may be combined to reduce the number of computations required.

An electric machine 14 may include a stator and a rotor. The power electronics module 26 may cause a current to flow in the stator windings. The stator current induces a current in the rotor windings. The resulting interaction between the stator and rotor currents may cause a torque on the rotor. The torque may cause the rotor to increase or decrease rotational speed. The stator and rotor currents may have different amplitudes and frequencies.

A high frequency current defined in a chosen reference frame may be injected into the electrical machine 14. The high frequency current may be injected under conditions in which an output shaft of the electric machine 14 is not already rotating and the electric machine 14 is not otherwise being controlled with current. The controller may monitor a signal from a position sensor coupled to the electric machine 14 to determine if the output shaft of the electric machine 14 is rotating. The output shaft of the electric machine 14 may be considered to be stationary if the speed of the electric machine 14 is less than a predetermined speed. The injection current may be used to determine a voltage command in the chosen reference frame to be applied to the electric machine 14. The voltage command for the electric machine 14 may be sampled and processed for HVIL detection.

Figure 2:
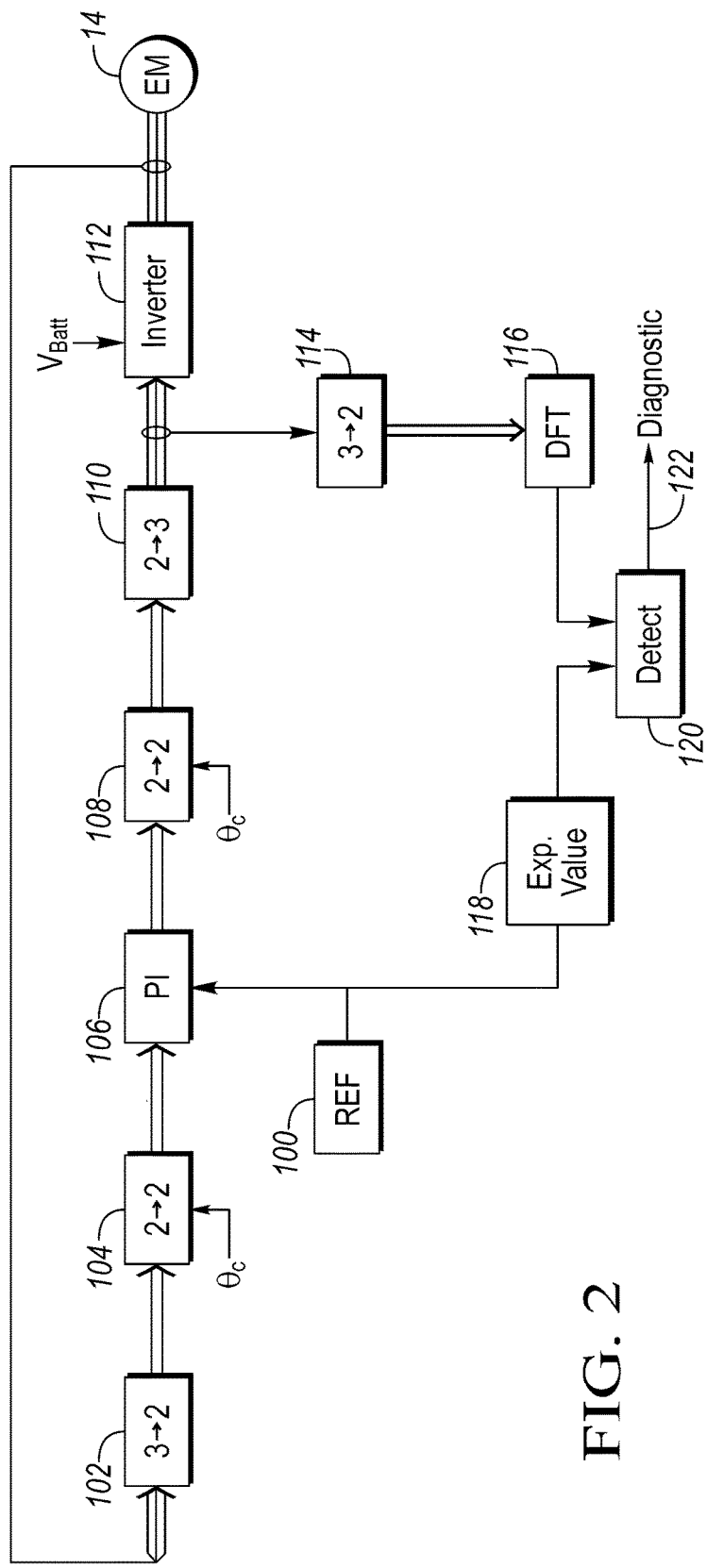
FIG. 2 is a block diagram of an exemplary controls configuration for detecting a loss of connection diagnostic between an electric machine and a power inverter.

FIG. 2 is a block diagram depicting an exemplary block diagram for a control system that may be implemented in a controller. The injection current in the stationary reference frame may be expressed as $$I_{HFI} = I_c e^{j\omega_c t} \quad (5)$$

where $I_c$ is an amplitude of the rotating current vector, and $\omega_c$ is the frequency of the rotating current vector. In the stationary reference frame, the injection current may be a vector of magnitude $I_c$ that rotates at the frequency $\omega_c$. The $I_\alpha$ component may be $I_c \cos(\omega_c t)$ and the $I_\beta$ component may be $I_c \sin(\omega_c t)$. The injection current may be represented by block 100 which outputs the desired injection current.

A two-axis dq-coordinate rotating reference frame that rotates at the frequency of the injection current may be chosen for the injection current control. The measured three phase currents may be converted into the stationary reference frame. The transformation to the stationary reference frame may be represented by block 102. Block 102 may perform the transformation as defined in Equation (1).

The stationary reference frame may be further transformed into a reference frame that rotates at the frequency of the injection current. The transformation to the injection signal reference frame may be represented by block 104. The transformation to the injection signal reference frame may be based on the following equations (similar to Equation (2)):

$$I_{q\_HFI} = I_\beta \cos(\theta_c) - I_\alpha \sin(\theta_c) \quad (6)$$

$$I_{d\_HFI} = I_\beta \sin(\theta_c) + I_\alpha \cos(\theta_c) \quad (7)$$

where $\theta_c$ represents an angular position of the injection current which may be derived from the injection current frequency and the sampling time.

Equations (6) and (7) may be used to convert the current from the stationary reference frame to a reference frame that rotates with the injection current (also referred to as the injection current reference frame). The injection current reference may be transformed into the rotating reference frame in a similar manner. In the injection current reference frame, the injection current of equation (5) may appear as a vector having a fixed d-component and a fixed q-component. Also note that the three phase currents may be transformed to the injection current reference frame using a combined transformation (e.g., blocks 102 and 104 may be combined into a single block).

To accurately control the magnitude and frequency of the high frequency current injection, a harmonic current controller 106 may be implemented in the injection signal reference frame. The magnitude of the actual current may differ from the injection current reference of equation (5) due to the impedance in the lines and connections.

One or more error signals may be computed as the difference between the injection current reference and the actual current. The error may be computed for both the d-component and the q-component. The error signals may be input into a current controller 106. The current controller 106 may be a proportional-integral (PI) type controller. The current controller 106 may be implemented for both the d-component and the q-component. The output of the current controller 106 may be a voltage command in the injection current reference frame.

The d-component voltage and the q-component voltage commands may represent a $V_{dq}$ voltage command vector. The voltage command in the injection current reference frame may be converted back to the stationary reference frames using the inverse Park transformation represented by block 108.

The dq-coordinates of the stator reference frame may then be transformed to the three-phase voltages using the inverse Clarke transformation as represented by block 110. Note that the transformation steps may be combined into one step in which the operations are combined to yield a transformation from the injection current reference frame to the three-phase values.

The three phase voltage commands may be provided to the inverter 112. The inverter 112 may control a pulse width modulated (PWM) output signal to associated switching devices to control the voltage of each phase. The resulting voltage may cause current to flow in the three phases of the electric machine 14. Under normal conditions, when the inverter 112 and electric machine 14 are properly connected, the current flowing through the electric machine 14 will be the controlled to the injection current reference. The current controller 106 will adjust the voltage command to drive the error between the injection current reference and the actual current to zero. When a connection between the power electronics module 26 and the electric machine 14 is disconnected or partially connected, the error may not be driven to zero. This may lead to a situation in which the voltage command increases to attempt to drive the error to zero.

Three-phase voltages and currents may be described by a positive sequence component, a negative sequence component, and a zero sequence component. The positive sequence voltage or current will have a magnitude and frequency based on the three-phase voltage or current. A vector representing the positive sequence component will rotate in a first direction. The negative sequence voltage or current will have magnitude and frequency based on the three-phase voltage or current. However, a vector representing the negative sequence component will rotate in a direction opposite to the first direction at which the positive sequence vector rotates.

The voltage command may be expressed as the sum of the positive sequence voltage, the negative sequence voltage, and the zero sequence voltage. The voltage command expressed as the sum may be converted to the dq-coordinate system as described herein. A voltage command to control the high frequency current injection has saliency information embedded and may be represented as $$V_{dqs}{}^s = V_{cp} e^{j(\omega_c t - \pi/2)} + V_{cn} e^{j(-\omega_c t - \pi/2 + 2\theta_r)} \quad (8)$$

where $V_{cp}$ and $V_{cn}$ represent a magnitude of a positive and negative sequence voltage command respectively, and $\theta_r$ is an angular position of the rotor.

The three phase voltage command signal may be transformed into the stationary reference frame as represented by block 114. Alternatively, the voltage command signal before being transformed into the three-phase voltages (input to block 110) may be used. The magnitude of the positive and negative sequence voltage command components may be estimated using a discrete Fourier transform (DFT) on the voltage command signal represented by block 116. The estimated magnitude of the positive and negative sequence voltage commands may be compared to expected values derived from inductance values of the electric machine. When a difference between the estimated values and the expected values is greater than a predetermined threshold a loss of physical cable connection may be detected.

The negative and positive sequence voltage components may be derived from the DFT 116. For the positive sequence voltage command, the DFT 116 may be expressed as $$X_k = \Sigma_{n=0}^{N-1} x_n {}^* e^{-j2\pi f_c T_s} \quad (9)$$

where N is the number of samples to be used based on detection requirements, $f_c$ is the frequency of the injected current, $T_s$ is the sampling interval, $x_n$ is the sampled voltage command of complex vector $V_{qds}$, and $X_k$ is the output of the DFT 116. The output $X_k$ may be a complex number from which an amplitude and phase component may be derived.

For the negative sequence voltage command, the DFT 116 may be expressed as $$X_k = \Sigma_{n=0}^{N-1} x_n {}^* e^{j2\pi f_c T_s} \quad (10)$$

The equation is slightly different because the frequency for the negative sequence is in the opposite direction.

The output of the DFT 116 may be a complex number and may be converted to a value having an amplitude and a phase. The amplitude of the DFT output may be expressed as $$|X_k| = \sqrt{\text{Re}(X_k)^2 + \text{Im}(X_k)^2}/N \quad (11)$$

where Re( ) is the real portion of the complex value and Im( ) is the imaginary portion of the complex value.

The output of each DFT 116 may be the commanded positive and negative sequence amplitude. The commanded positive and negative sequence values may be predicted as represented by block 118. The expected values of the positive and negative sequence components may be expressed as $$V_{pos} = \frac{I_s \omega_c (L_d + L_q)}{2} \quad (12)$$

$$V_{neg} = \frac{I_s \omega_c (L_q - L_d)}{2} \quad (13)$$

where $I_s$ is the magnitude of the high frequency injection current, and $\omega_c$ is the frequency of the high frequency injection current, $L_d$ and $L_q$ are a dq-axis inductance for the electric machine under a non-saturated operating condition, and $V_{pos}$ and $V_{neg}$ are the expected positive and negative voltage sequence command voltages. When the connections between the electric machine 14 and the power electronics modules 26 are properly connected, the predicted values and the actual values from the DFT should be relatively close in magnitude.

The output of the DFT 116 for the positive and negative sequence amplitudes may be compared to the associated expected amplitude. The comparison and detection may be represented by block 120. A difference between the voltage command value from the DFT and the associated expected value may be computed for each of the positive and negative sequence terms. If the magnitude of either difference is greater than a predetermined threshold, then a loss of connection diagnostic 122 may be output.

Figure 3:
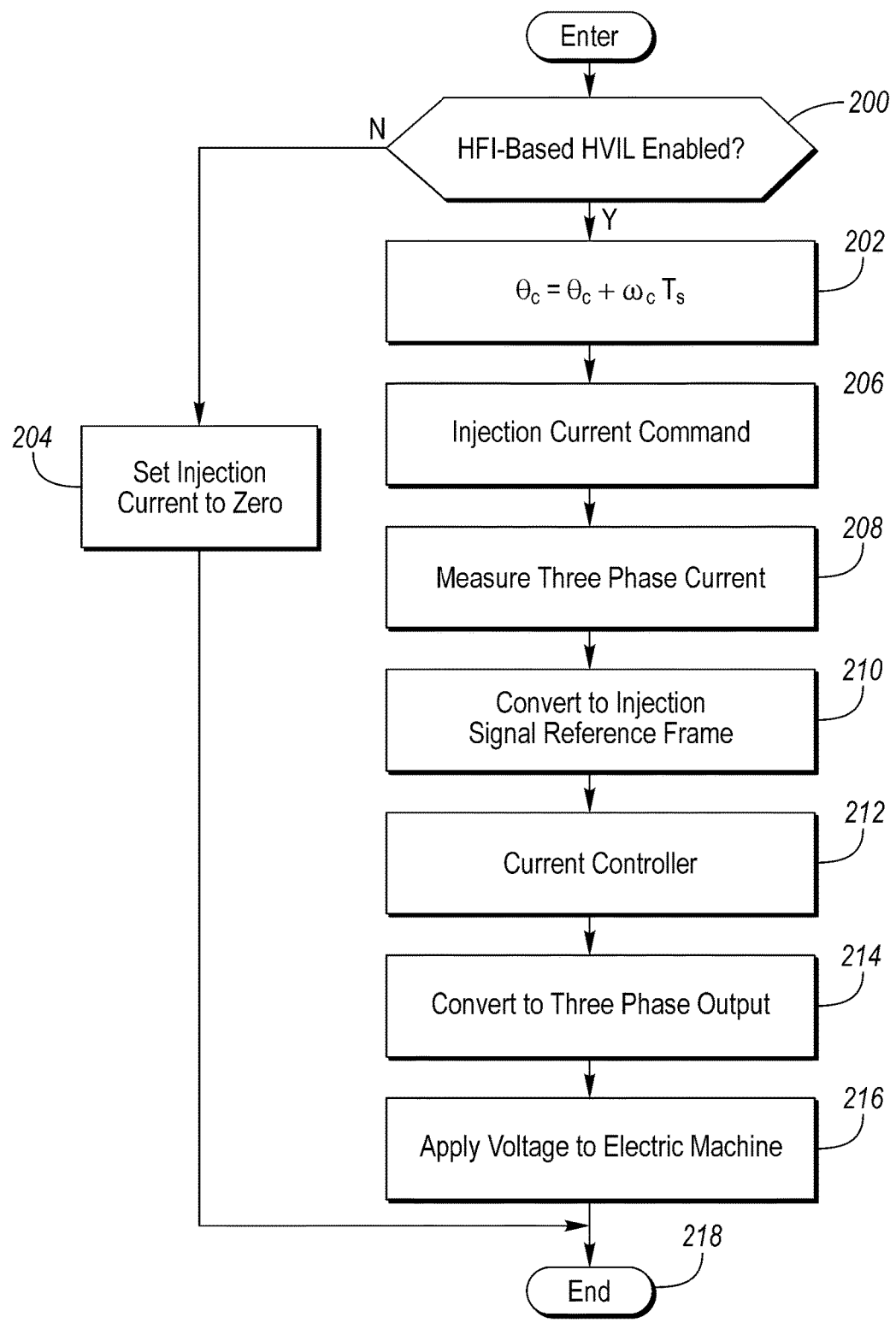
FIG. 3 is a flowchart of an exemplary sequence of operations for injecting a current into an electric machine.

The detection system may be comprised of an injection routine and a detection routine. FIG. 3 depicts an exemplary flowchart of operations that may be implemented as part of the injection routine. The injection routine may inject the high frequency injection current into the electric machine 14. The controller may perform operation 200 to determine if the HVIL is enabled or allowed to be performed. One condition may be that the electric machine 14 is not otherwise commanded and is at zero speed. If it is determined that the HVIL is not enabled, operation 204 may be performed to set the injection current to zero.

If it is determined that the HVIL is enabled, the controller may then perform operation 202 to update the injection current phase angle. The phase angle may be updated by an amount based on the injection frequency and the sampling rate. The controller may then perform operation 206 to calculate the injected current command as described herein. The injected current command may be in the coordinates of the injection signal reference frame.

The controller may then perform operation 208 to measure the three phase currents using one or more current sensors. Operation 210 may be performed to transform the measured three phase currents into the injection signal reference frame as described herein. Operation 212 may be performed that implements the current controller 106 in which an error between the injected current command and the actual current may be computed. The error may be input into a PI-controller to generate a voltage output. The voltage output may be the voltage necessary to create the desired injection current. Note that a controller may be implemented for the d-component and the q-component of the transformed system.

Operation 214 may be performed to transform the voltage output in dq-coordinates to a three-phase voltage command as described herein. Operation 216 may be performed to translate the voltage output command to an appropriate switching pattern and apply the switching pattern to the electric machine 14. The injection process for the given iteration may end at operation 218. The process may be continually repeated at the specified sampling rate.

Figure 4:
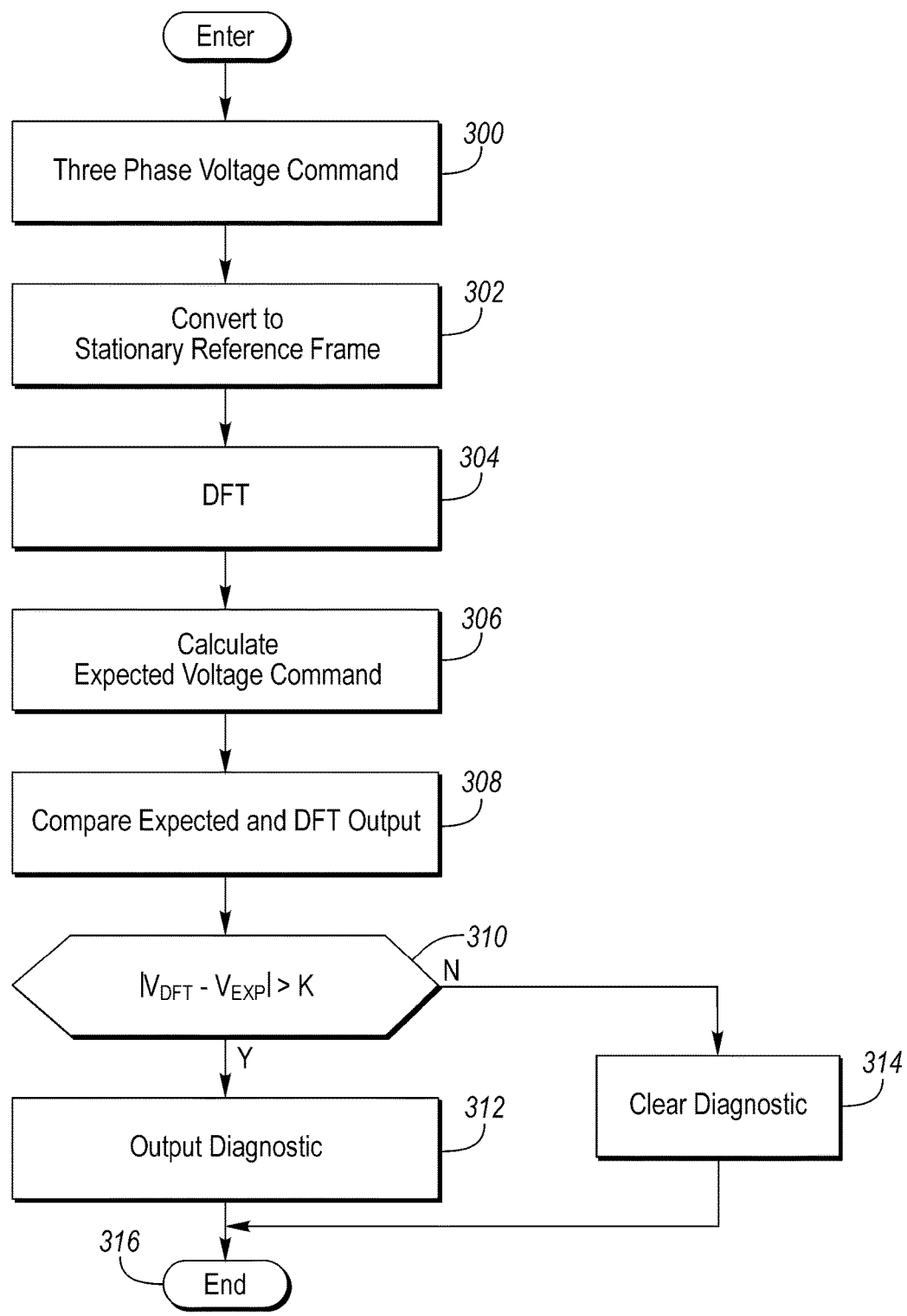
FIG. 4 is a flowchart of an exemplary sequence of operations for detecting a loss of connection diagnostic.

FIG. 4 depicts an exemplary flowchart of a sequence of operations that may be performed as part of the detection routine. The detection routine may be performed at a different sampling rate than the injection routine. The DFT may use a number of samples to generate an output. The samples may be collected at a faster sample rate and then processed at a later time. The controller may execute instructions at operation 300 to sample and store the three-phase voltage command. At operation 302, the three-phase voltage command may be transformed to the stationary reference frame. At operation 304, the DFT may be executed to determine the positive and negative sequence voltages of the voltage command. At operation 306, the expected positive and negative sequence voltage commands may be computed. The amplitude for the positive and negative sequence voltage command from the DFT may be compared to the expected positive and negative sequence voltage command at operation 308. At decision block 310, the magnitude of the differences between the DFT sequence voltages and the expected sequence voltages may be compared to a predetermined threshold. If the magnitude is greater than the predetermined threshold then operation 312 may be performed to output a loss of connection diagnostic. If the magnitude is not greater than the predetermined threshold, then operation 314 may be performed to clear the loss of connection diagnostic.

The loss of connection diagnostic may store a diagnostic trouble code (DTC) in the non-volatile memory of the controller. The loss of connection diagnostic may cause the power electronics module 26 to disable outputs to the affected electric machine 14. The disabling of the output may prevent voltage and current from being applied at the output of the power electronics module 26 for propulsion purposes. The loss of connection diagnostic may be indicated to the operator via a lamp or a warning message in a display.

The condition may continue to be monitored. The high frequency current may be periodically injected to determine if the connection has been established. When the magnitude of the difference is less than the predetermined threshold for both the positive and negative sequence voltage commands, the loss of connection diagnostic may be cleared. Clearing of the loss of connection diagnostic may permit normal operation of the power electronics module 26 and the electric machine 14. A loss of connection diagnostic may be retained as historical data within the non-volatile memory of the controller.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an electric machine; and
   a controller programmed to apply a voltage to the electric machine corresponding to an injection current, a frequency of the injection current being a predetermined multiple of a switching frequency corresponding to a rate at which the voltage is changed, and, in response to amplitudes of positive and negative sequence voltages derived from the voltage being a predetermined amount greater than corresponding predetermined sequence voltage amplitudes that are based on parameters of the injection current and parameters of the electric machine, output an indicator for a loss of electric machine connection.

2. The vehicle of claim 1 wherein a magnitude of the injection current is a predetermined magnitude.

3. The vehicle of claim 1 wherein the controller is further programmed to apply the voltage when a speed of the electric machine is less than a predetermined speed.

4. The vehicle of claim 1 wherein the predetermined sequence voltage amplitudes are based on an inductance of the electric machine.

5. The vehicle of claim 1 wherein the voltage increases in response to a connection to the electric machine being disconnected.

6. The vehicle of claim 1 wherein the controller is further programmed to receive a measured current in the electric machine and control the voltage according to a difference between the measured current and the injection current.

7. A method comprising:
   causing, by a controller, a power inverter to output a voltage to an electric machine based on a measured current and a diagnostic injection current reference having a frequency that is a predetermined multiple of a switching frequency corresponding to a rate at which the voltage is changed; and
   indicating, by the controller, a loss of electric machine connection in response to positive and negative sequence voltage amplitudes derived from the voltage being greater than predetermined positive and negative sequence voltage amplitudes by a predetermined amount.

8. The method of claim 7 wherein the predetermined positive and negative sequence voltage amplitudes are based on parameters of the diagnostic injection current reference and parameters of the electric machine.

9. The method of claim 7 wherein the positive and negative sequence voltage amplitudes are based on a discrete Fourier transform of the voltage.

10. The method of claim 7 wherein the voltage is based on a difference between the diagnostic injection current reference and the measured current.

11. A power inverter comprising:
a controller programmed to apply a voltage to an electric machine corresponding to an injection current and, in response to positive and negative sequence voltage amplitudes derived from the voltage being greater than corresponding predetermined sequence voltage amplitudes that are based on parameters of the injection current and parameters of the electric machine by a predetermined amount, output an indicator for a loss of electric machine connection to the power inverter, wherein a frequency of the injection current is a predetermined multiple of a switching frequency corresponding to a rate at which the voltage is changed.

12. The power inverter of claim 11 wherein a magnitude of the injection current is a predetermined magnitude.

13. The power inverter of claim 11 wherein the controller is further programmed to apply the voltage when a speed of the electric machine is less than a predetermined speed.

14. The power inverter of claim 11 wherein the predetermined sequence voltages are based on an inductance of the electric machine.

15. The power inverter of claim 11 wherein the voltage increases in response to a connection to the electric machine becomes disconnected.

16. The power inverter of claim 11 wherein the controller is further programmed to measure a current in the electric machine and control the voltage according to a difference between the current and a desired injection current.

17. The power inverter of claim 11 wherein the positive and negative sequence voltage amplitudes are based on a discrete Fourier transform of the voltage.

* * * * *